Oct. 10, 1967     B. F. LATHAM, JR     3,346,338
PRODUCTION OF FINELY DIVIDED SILICON OR TITANIUM CARBIDE
Filed Jan. 20, 1964
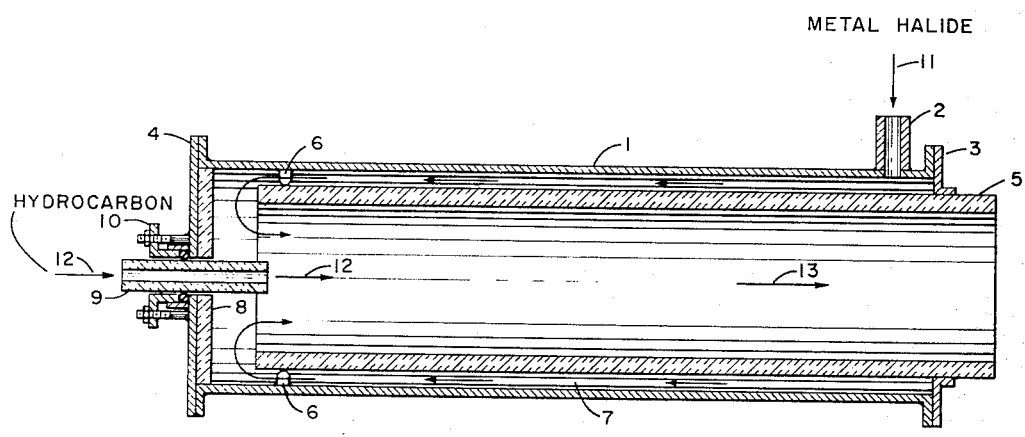
INVENTOR.
BURTON F. LATHAM JR.
BY
William A. Mikesell Jr.
ATTORNEY 3,346,338
PRODUCTION OF FINELY DIVIDED SILICON
OR TITANIUM CARBIDE
Burton F. Latham, Jr., Houston, Tex., assignor to Continental Carbon Company, Houston, Tex., a corporation of Delaware
Filed Jan. 20, 1964, Ser. No. 338,921
5 Claims. (Cl. 23—208)

This invention relates to a process for producing finely divided carbides such as silicon carbide and titanium carbide. In one aspect, the invention relates to a process for producing finely divided carbides in which a silicon or titanium halide is vaporized and admixed with a vaporous hydrocarbon, and finely divided carbide is recovered from the resulting gaseous suspension. In another aspect, the aforementioned admixture is passed through a reaction zone at a velocity at least sufficient to result in turbulent flow therein. In yet another aspect, the feed halide is preheated to approach reaction temperature prior to its admixture with the hydrocarbon.

Silicon and titanium carbides have generally been produced in the past by reaction of the appropriate dioxide, e.g. $SiO_2$ or $TiO_2$, with coke or a similar form of carbon in an electrothermal furnace. Normally, especially in the case of the silicon carbide, sawdust is also included in the furnace charge in order to increase the porosity of the product. The furnace method of making titanium carbide requires the additional precaution of providing a protective atmosphere, which is effected by use of an inert gas or a vacuum or, alternatively, by immersion of the reactants in a molten metal such as iron or nickel. Among the disadvantages of these prior art processes are high energy consumption, large equipment investment requirement, and crudeness of the furnace product. Regarding this latter point, the product has associated with it the various impurities normally contained in coke and especially in sand, and for this reason must be washed and leached. Also, the product in its crude state comprises large clumps, which must be crushed and ground, and then graded to size.

Accordingly, it is an object of this invention to provide a process for producing carbides in a simple manner and with low energy consumption. It is another object of the invention to produce carbides which the amendable for use without the usual crushing and grinding operations. It is still another object of the invention to produce finely divided carbides of high purity.

Other aspects, objects and the several advantages of this invention will become apparent upon study of this specification, the appended claims and the drawing, in which:

The sole figure is a sectional elevation of an apparatus suitable for carrying out the process of this invention.

According to the invention, there is provided a process for producing a finely-divided carbide selected from the group consisting of silicon carbide and titanium carbide which comprises providing an elongated reaction zone, passing in indirect heat exchange with an exterior portion of the reaction zone a vapor of a compound selected from the group consisting of silicon and titanium chlorides and bromides, admixing with the resulting vapor a vaporous hydrocarbon, passing the resulting admixture into one end of the reaction zone, and recovering from the other end of the reaction zone finely-divided carbide product. In one embodiment of the invention, the admixture is passed through the reaction zone at a velocity sufficient to impart turbulent flow. In another embodiment, the finely divided carbide which is recovered from the reactor as a suspension in gas is collected by cooling and filtering the gaseous suspension. In still another embodiment, the carbide is collected from gaseous suspension by scrubbing with water and filtering the resulting slurry.

The invention will now be further explained by reference to the sole figure, in which a reactor shell 1, which can for example be cylindrical, is provided with a fluid inlet nozzle 2 and end flanges 3 and 4. Shell 1 is of suitable temperature-resistant material, such as stainless steel, and is preferably provided with external insulation, not shown. Disposed within shell 1 is an elongated reactor tube 5, suitably of a temperature-resistant material such as graphite, which is spaced from the walls of shell 1 by centering lugs 6 and end flange 3 so as to form an annular zone 7. End flange 4 is also protected by a temperature-resistant disc 8, of a material such as graphite. Through end flange 4 and disc 8 is provided an inlet conduit 9 which is directed axially into reactor 5. Conduit 9 is also of a temperature-resistant material such as graphite, and can be provided with a suitable packing gland 10. In operation, a metal halide stream 11 is passed via nozzle 2 to the annular space 7, where it is preheated by indirect heat exchange through reactor tube 5. The heated metal halide stream then reverses its direction upon meeting disc 8, and passes outward through reactor 5. Hydrocarbon feed stream 12 is introduced by way of conduit 9, and mixes with the metal halide at the upstream end of reactor 5. The reaction in reactor 5 produces a suspension of finely divided metal carbide in vapor, which passes out of the reactor as stream 13 and is taken to further processing for product recovery.

Suitable metal halides used in the process of my invention are those chlorides, iodides and bromides of the metals titanium and silicon which can be vaporized without decomposition, and include $SiBr_4$, $Si_2Br_6$, $SiCl_4$, $Si_2Cl_6$, $SiI_4$, $TiCl_4$, $TiBr_4$ and $TiI_4$. Presently preferred because of cost and availability are $SiCl_4$ and $TiCl_4$. The metal halide is vaporized prior to its passage into inlet nozzle 2, and can if desired be diluted with a suitable gas inert to the subsequent reaction. The halide is then preheated, as mentioned previously, so that it is at least at about reaction temperature at the time it mixes with the hydrocarbon at the outlet of conduit 9. Reaction temperature varies with the metal halide and hydrocarbon charge, and is readily ascertained by routine experimentation. Preferably the temperature at the upstream end of reactor 5 is at least about 1800° F.

Hydrocarbons suitable for the process of my invention include natural gas and the lower paraffins, such as methane, ethane, etc., petroleum oils and coal tars. The hydrocarbon stream 12 is vaporized prior to its passage into inlet 9, and can be preheated. The hydrocarbon can also be diluted with a suitable inert gas such as nitrogen, helium, etc. The hydrocarbon stream can be introduced as a true gas or can be atomized as finely divided droplets of liquid.

The reaction in reactor 5 can be represented, in the case of methane and silicon tetrachloride, by the equation $$CH_4 + SiCl_4 \rightarrow 4HCl + SiC$$

similar reactions occur with other hydrocarbons and other metal halides. If an unsaturated hydrocarbon such as acetylene is used, carbon black as well as the metal carbide can be produced according to the equation $$2C_2H_2 + SiCl_4 \rightarrow 4HCl + SiC + 3C$$

If carbon black is not desired as a product, the hydrocarbon feed can be supplemented with hydrogen, so that the reaction with e.g. acetylene follows the equation $$C_2H_2 + 3H_2 + 2SiCl_4 \rightarrow 2SiC + 8HCl$$

The ratio of carbide to carbon black can accordingly be controlled in the product by addition of hydrogen to the feed. Similar reactions occur when using the titanium halides. It is preferred to use sufficient feed flow rates to maintain turbulent flow conditions in reactor 5, since a more uniform product size distribution results.

As can be seen from the preceding equations, the products of the reactor comprise the metal carbide, which is produced in an extremely finely divided solid form, and gaseous hydrogen halide along with finely divided carbon black when desired. The solids can be recovered from the vapor suspension by either wet or dry collection. In wet collection, the reactor effluent gas is scrubbed with water to absorb the hydrogen halide gas; this results in a dilute acid slurry of the carbide solids, along with carbon black when desired. The slurry is then filtered to recover product solids. A portion of the water used in this collection method can be injected directly into the product line just downstream of the reactor as a quench, if desired. In dry collection, the effluent is cooled by indirect heat exchange and then separated from the dry hydrogen halide gas by filtration with a glass cloth bag, as is known in the carbon black art, or by other dry separation such as electrostatic precipitation or a combination of these techniques.

The carbide products of this invention are useful as pigments, which impart high abrasion resistance to natural and synthetic rubbers. When used in sufficient quantities in rubber and plastic formlations, they impart improved heat and fire resistance. The products are also useful as abrasives, for instance as used in sand blasting, and can be graded for size for manufacture of abrasive papers and cloths. When the reactor is operated to produce carbon black along with the carbide, these two solid products do not need to be separated, but can be used as produced for incorporation in natural or synthetic rubber blends, such as for tread stocks. The products, either carbide or a mixture thereof with carbon black, are also useful as refractories and as electrical resistances.

The invention will be further illustrated by the following example.

EXAMPLE

A reactor of the configuration shown in the figure is provided with a reactor tube of 4″ I.D. and 4′–0″ length. Methane gas at a temperature of about 750° F. is passed at a rate of 100#/hr. to the reactor as hydrocarbon feed. Silicon tetrachloride at a rate of about 1060#/hr. is preheated to a temperature of about 1000° F. and then passed to nozzle 2 of the reactor. The temperature within the reaction tube is maintained at about 2800° F. There is recovered as reactor product a gaseous hydrogen chloride suspension of about 250#/hr. of finely divided silicon carbide.

I claim:
1. A process for producing a finely-divided carbide selected from the group consisting of silicon carbide and titanium carbide which comprises providing an elongated reaction zone, passing in indirect heat exchange with an exterior portion of the reaction zone a vapor of a compound selected from the group consisting of silicon and titanium chlorides and bromides, admixing with the resulting vapor a vaporous hydrocarbon, passing the resulting admixture into one end of the reaction zone at a velocity sufficient to result in turbulent flow therein, maintaining an upstream portion of said reaction zone at a temperature of at least about 1800° F., and recovering from the other end of the reaction zone a gaseous suspension of finely-divided carbide product.
2. The process of claim 1 wherein said recovering comprises filtration of said carbide product from gaseous suspending medium.
3. The process of claim 1 wherein said recovering comproses scrubbing said carbide in its gaseous suspending medium with water and filtering product from the resulting slurry.
4. The process of claim 1 wherein said hydrocarbon comprises a vaporized normally liquid hydrocarbon oil.
5. The process of claim 1 wherein there is also passed to said reaction zone a stream comprising hydrogen.

References Cited
UNITED STATES PATENTS

| | | | |
|---|---|---|---|
| 821,017 | 9/1906 | Clark | 23—208 X |
| 2,532,295 | 12/1950 | Gardner | 23—208 |
| 2,915,371 | 12/1959 | Sweitzer | 23—209.4 |
| 2,952,598 | 9/1960 | Suchet. | |
| 2,962,388 | 11/1960 | Ruppert et al. | 23—208 X |
| 3,174,827 | 3/1965 | Wakelyn et al. | 23—208 |
| 3,205,042 | 9/1965 | Jacobson | 23—208 |
| 3,236,673 | 2/1966 | O'Connor et al. | 23—208 X |

OSCAR R. VERTIZ, *Primary Examiner.*

MILTON WEISSMAN, *Examiner.*

G. T. OZAKI, *Assistant Examiner.*